United States Patent Office 2,906,592
Patented Sept. 29, 1959

2,906,592

FLAME- AND CREASE-RESISTANT TEXTILES FROM AZIRIDINE CARBOXYALKYLCELLULOSE

Wilson A. Reeves, Metairie, John D. Guthrie, New Orleans, and George L. Drake, Jr., Metairie, La., assignors to the United States of America as represented by the Secretary of Agriculture No Drawing. Application August 20, 1957
Serial No. 679,326

7 Claims. (Cl. 8—116.2)

(Granted under Title 35, U.S. Code (1952), sec. 266)

A non-exclusive, irrevocable, royalty-free license in the invention herein described, for all purposes of the United States Government, throughout the world with the power to grant sublicenses for such purposes, is hereby granted to the Government of the United States of America.

This invention relates to new flame-resistant, crease-resistant textiles and processes for their production. These new materials are especially suitable for use in clothing, tents, paulins, awnings and the like uses.

This application is a continuation-in-part of our copending application, Serial No. 626,272, filed December 4, 1956. Our copending application relates to polymers made from 1-aziridinyl compounds and carboxylic acids.

In general this invention relates to flame-resistant and crease-resistant textiles produced by the reaction of compounds which contain two or more 1-aziridinyl groups

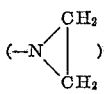

attached directly to phosphorus atoms with carboxyalkylcellulose which contain a plurality of carboxylic acid groups

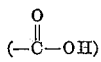

It is an objective of the present invention to prepare a new group of flame- and crease-resistant cellulosic textiles which have particular utility in garments for civilian and military purposes, for use in tents, awnings and in general wherever flame- or crease-resistant textiles are needed. A particular feature of this new group of flame- and crease-resistant textiles is that it constitutes a chemical modification of cellulose. Other objectives of the invention will be apparent to those skilled in the art as the description of the invention proceeds.

We have discovered that compounds which contain two or more 1-aziridinyl groups attached directly to a phosphorus atom react with cellulose containing a plurality of carboxylic acid groups to produce chemically modified flame- and crease-resistant textiles. Such flame-resistant materials contain the characteristic reoccurring structures,

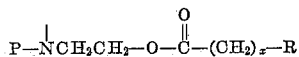

and

wherein R is an anhydroglucose unit, —OC$_6$H$_9$O$_4$, of cellulose, and $x$ is 1, 2, or 3.

Such modifications of cellulose can be produced so as to be soluble in water or other solvents or they may be insoluble. As insoluble materials they are particularly valuable for use in textiles. As soluble materials they are of value in the finishing of textiles, leather and paper. The modified celluloses contain nitrogen and phosphorus and are flame-resistant.

1-aziridinyl compounds suitable for use in this invention are compounds that contain the following structure:

where Z is oxygen or sulfur; X is

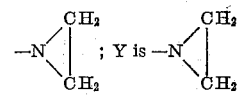

a dialkyl amine, an alkyl, an alkylene or an aryl group. Some typical examples of compounds are:

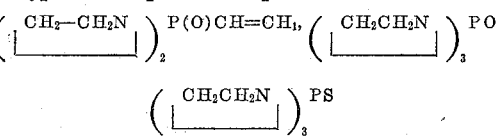

These 1-aziridinyl compounds can be prepared by substantially any of the known processes for producing such compounds. In general, they are prepared by reacting ethylenimine with the corresponding non-metallic halide in the presence of an acid acceptor such as triethanolamine.

Carboxyalkylcelluloses suitable for use in this invention include substantially any derivative of cellulose that contains a plurality of carboxyalkyl groups,

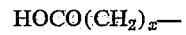

The amount of carboxyalkyl groups or the degree of substitution may range from about one carboxyalkyl per fifty anhydroglucose units up to about three carboxyalkyl groups per anhydroglucose units. The cellulose derivatives with the higher degree of substitution are soluble in water and dilute alkali. Some specific carboxyalkylcelluloses that can be used in practicing the present invention are given below:

Carboxymethylcellulose, (HOCOCH$_2$—O-cellulose)
Carboxyethylcellulose, (HOCOCH$_2$CH$_2$—O-cellulose)

The invention is not limited to the use of only these cellulosic derivatives. The cellulosic derivative may contain other functional groups such as carbamoylethyl and cyanoethyl groups.

The proportions of reactants can be varied widely depending, for example, upon the particular properties desired in the final product. Considerably more of the 1-aziridinyl compound than the stoichiometrical amount for reacting with the carboxy groups can be chemically bound to the modified cellulose since a carboxy group not only reacts with a 1-aziridinyl group but in doing so produces another group,

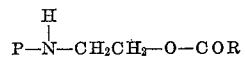

containing a hydrogen atom attached to trivalent nitrogen that may react with an additional 1-aziridinyl ring to produce a stable link containing the structure:

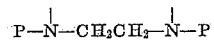

1-aziridinyl compounds react with carboxylic acid groups almost quantitatively when they are used in quantities not to exceed about one aziridinyl group per carboxy group. The properties of carboxymethylcellulose containing one carboxymethyl groups per fifteen anhydroglucose units may be markedly changed by reacting as little as 2% tris(1-aziridinyl)phosphine sulfide with it. In practicing this invention the reaction of the 1-aziridinyl compound with carboxyalkylcellulose can be carried out at widely varied temperatures; the reaction proceeds slowly at 20° C. but very rapidly at 140° C. When carboxyalkylcellulose is in the form of a textile, the reaction can be carried out by two methods conventionally used for finishing textiles. For example, the textile can be padded in a solution of the 1-aziridinyl compound and then dried in an oven or ironed dry, or the textile can be agitated in the solution at a convenient temperature until the reaction has proceeded to the desired extent. If the carboxyalkylcellulose is a highly substituted cellulose derivative, it may be soluble in water. In this case, the carboxyalkylcellulose may be dissolved and reacted in solution or it may be reacted with the 1-aziridinyl compound in a system in which the carboxyalkylcellulose is insoluble. Suitable solvents include acetone, ethanol and benzene. Although ethanol and other alcohols react with both the 1-aziridinyl compounds and with carboxylic acids, the reaction of 1-aziridinyl compounds with carboxylic acids is much faster at a given temperature. Therefore, the reaction may be carried out in alcoholic solvents with only slight modification of the 1-aziridinyl-carboxyalkylcellulose. For best results, the carboxyalkyl cellulose should be in the free acid form and not as the metal salt. When in the form of the metal salt, it can be converted to free acid form by first rinsing or soaking in a dilute (3–5%) mineral acid and then rinsing with water.

The following examples are given by way of illustration and not by way of limitation of this invention. All parts and percentages are by weight. For convenience, the compound, tris(1-aziridinyl)phosphine sulfide and tris(1-aziridinyl)phosphine oxide are referred to as APS and APO respectively.

*Example 1*

Eight grams of sodium carboxymethylcellulose in the form of a print cloth containing one carboxy group per fifteen anhydroglucose units was converted to the free acid form by soaking for 5 minutes in dilute hydrochloric acid and then rinsed in water and air dried. The air dried sample was padded with a solution containing 5 parts of APS and 22 parts of water to a 62.5% wet pickup. It was then heated 5 minutes at 90° C. and then washed thoroughly in hot water and again air dried. The weight increase of the fabric due to reaction of APS with the carboxymethylcellulose was 8.2%. This indicates that of the APS present about 85% entered the reaction and became fixed to the cellulose. The treated fabric contained phosphorus and nitrogen and did not show ion exchange properties as is characteristic of carboxymethylcellulose. The treated fabric was sufficiently flame resistant to pass the 100° angle in the strip flame test. The fabric had a tear strength of 2.1 lbs. according to the Elmendorf test method.

A similar cotton print cloth which did not contain carboxymethyl groups was treated with a solution of APS and heated as described above. After washing and air drying, the weight increase was only 1.4%. This fabric had little or no flame resistance. It had a tear strength of 2.3 lbs as determined by the Elmendorf test method.

*Example 2*

Two samples, A and B, of carboxymethylcellulose in the form of a print cloth containing one carboxy group per ten anhydroglucose units were converted to the free acid form by soaking 30 minutes in 12% acetic acid. The two samples along with a sample of print cloth designated "C" and not containing carboxymethyl groups were placed into an aqueous 4.5% APS solution. The solution to fabric weight ratio was about 12 to 1. The solution containing the three samples was heated to 90° C. Sample A was removed after 10 minutes while samples B and C were removed after 30 minutes. All samples were washed thoroughly in hot water and then air dried. The Elmendorf tear strength was 2.1, 2.2 and 2.6 lbs. respectively for samples A, B, and C. Sample A contained 0.73% phosphorus and B contained 0.92% phosphorus. Sample C contained only a trace of phosphorus. Samples A and B passed the 90° angle in the strip flame test while C did not pass the 0° angle in the flame test.

*Example 3*

A print cloth containing one carboxymethyl group per ten anhydroglucose units was put into the free acid form by rinsing in dilute hydrochloric acid. The dry sample was then padded in a solution containing 6.5 parts APS, 18 parts of water and 5 parts of dioxane. The wet pickup of the solution was 69.7%. It was heated in a forced draft oven for 3.5 minutes at 95° C. and then washed and air dried. The fabric had a weight increase of 15.3% due to the treatment. According to the concentration of the solution and wet pickup of the fabric only 15.3% of solid material was added to the fabric, then 100% of the added material was permanently fixed to it. However, according to phosphorus analysis the fabric contained 1.47% phosphorus.

The treated print cloth was flame resistant and crease resistant. The crease recovery angle (Monsanto tester) was 136 for the warp by 146 for the filling as compared to 76 warp by 92 filling for untreated print cloth. The tear strength was 2.0 lbs. in the warp as compared to 2.8 lbs. for untreated print cloth.

*Example 4*

A cotton print cloth containing one carboxymethyl group per ten anhydroglucose units was put into the free acid form by regeneration in dilute hydrochloric acid. The air dry sample was cut into two parts—A and B. Fabric A was padded in a 21% aqueous solution of APS and then dried by ironing with a hand iron set at "Cotton" (about 400° F.). The hot iron was intermittently held on the cloth for one minute. Fabric B was padded in a solution containing 21% APO, 14% ethanol and 65% water. This fabric was ironed dry exactly as described above for A. Both fabrics, A and B, were washed thoroughly in hot water. The angle of recovery in the Monsanto crease test was 136 and 141 in the warp direction for fabric A and B respectively. Untreated fabric had a recovery angle of 76. Both A and B fabrics were flame resistant and contained phosphorus and nitrogen.

*Example 5*

A sample of cotton sheeting containing 0.06 carbamoylethyl groups per anhydroglucose unit and 0.04 carboxyethyl groups per anhydroglucose unit was padded in a solution containing 10% APO and then dried for 5 minutes at 100° C. After thorough washing in hot tap water and air drying, the fabric was flame resistant and contained phosphorus and nitrogen.

*Example 6*

Two parts of a water soluble carboxymethylcellulose of medium viscosity in the salt form was dissolved in 50 parts of water. Two ml. of the solution was placed on four watch glasses—A, B, C, and D. About 50 mg. of APS was dissolved in solutions B and D. Solutions A and B were allowed to stand at about 25° C. for about 72 hours during which time thin films formed. Solutions C and D were heated at 100° C. until a thin film formed (5–7 minutes). After these treatments, films A and C were highly water soluble but B and D were not soluble in water. Films B and D contained nitrogen and phosphorus.

We claim:

1. Cellulosic materials which contain nitrogen atoms attached directly to pentavalent phosphorus atoms in the reoccurring connecting structures

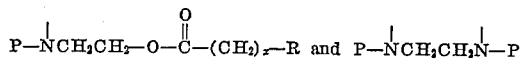

wherein the phosphorus is pentavalent, R is an anhydroglucose unit of cellulose and $x$ is an integer from 1 to 3.

2. A process for producing flame-resistant cellulosic materials which comprises providing, at a temperature of about 10° to 180° C., a mixture of a carboxyalkylcellulose with an aziridinyl compound from the group consisting of a 1-aziridinyl phosphine oxide having at least two 1-aziridinyl groups and a 1-aziridinyl phosphine sulfide having at least two 1-aziridinyl groups in an inert solvent to cause the aziridinyl compound to react with the carboxy groups of the carboxyalkylcellulose.

3. The reaction product of a carboxyalkylcellulose with an aziridinyl compound from the group consisting of a 1-aziridinyl phosphine oxide having at least two 1-aziridinyl groups and a 1-aziridinyl phosphine sulfide having at least two 1-aziridinyl groups.

4. A process of producing a flame- and crease-resistant textile material which comprises providing, at a temperature of about from 10° to 180° C., a mixture of a carboxyalkylcellulose textile material having from about one carboxyalkyl group per fifty anhydroglucose units to about three carboxyalkyl group per anhydroglucose unit with an aziridinyl compound from the group consisting of a 1-aziridinyl phosphine oxide having at least two 1-aziridinyl groups and a 1-aziridinyl phosphine sulfide having at least two 1-aziridinyl groups in an inert solvent to cause the aziridinyl compound to react with the carboxy groups of the carboxyalkylcellulose.

5. A flame- and crease-resistant textile material produced by the process of claim 4.

6. The process for producing a flame- and crease-resistant textile material which comprises impregnating a carboxymethylated cellulosic textile material with a solution of tris (1-aziridinyl) phosphine sulfide in an inert solvent and heating the impregnated material to cause the tris (1-aziridinyl) phosphine sulfide to react with the carboxy groups of the carboxymethylated textile material.

7. The process for producing a flame- and crease-resistant textile material which comprises impregnating a carboxymethylated cellulosic textile material with a solution of tris (1-aziridinyl) phosphine oxide and heating the impregnated material to cause the tris (1-aziridinyl) phosphine oxide to react with the carboxy groups of the carboxymethylated textile material.

References Cited in the file of this patent

UNITED STATES PATENTS

| | | |
|---|---|---|
| 2,286,726 | Gordon | June 16, 1942 |
| 2,606,900 | Parker et al. | Aug. 12, 1952 |
| 2,606,902 | Parker et al. | Aug. 12, 1952 |
| 2,654,738 | Lecher et al. | Oct. 6, 1953 |
| 2,672,459 | Kuh et al. | Mar. 16, 1954 |
| 2,691,567 | Kvalnes et al. | Oct. 12, 1954 |
| 2,824,779 | Reeves et al. | Feb. 25, 1958 |

FOREIGN PATENTS

| | | |
|---|---|---|
| 854,651 | Germany | July 8, 1949 |
| 863,055 | Germany | July 8, 1949 |
| 888,853 | Germany | July 8, 1959 |